(No Model.) 2 Sheets—Sheet 1.

T. BELL.
CORN PLANTER.

No. 292,619. Patented Jan. 29, 1884.

WITNESSES:
Chas. Nida
B. G. Underwood.

INVENTOR:
T. Bell
BY Munn & Co.
ATTORNEYS.

(No Model.) 2 Sheets—Sheet 2.

T. BELL.
CORN PLANTER.

No. 292,619. Patented Jan. 29, 1884.

WITNESSES:

INVENTOR:
T. Bell.
BY Munn & Co
ATTORNEYS.

UNITED STATES PATENT OFFICE.

THOMAS BELL, OF SHELBY CITY, KENTUCKY.

CORN-PLANTER.

SPECIFICATION forming part of Letters Patent No. 292,619, dated January 29, 1884.

Application filed August 20, 1883. (No model.)

*To all whom it may concern:*

Be it known that I, THOMAS BELL, of Shelby City, in the county of Boyle and State of Kentucky, have invented a new and Improved Corn-Planter, of which the following is a full, clear, and exact description.

The object of my invention is to provide a new and improved attachment and check-rower for corn-planting machines, which drops the corn at the required distances, and is provided with an automatic marker, which indicates the position of the corn dropped, thereby making it easy to pass obstructions and to plant the corn in straight rows.

The invention consists in a corn-planter attachment constructed with a reciprocating bar for alternately opening and closing the openings in the seed-boxes, which reciprocating bar is connected by a pivoted lever with a T-shaped lever to swing in the horizontal plane, in the ends of the cross-pieces of which T-shaped lever the upper ends of levers are held, the lower ends of which are struck by pins projecting from a cog-wheel operated by a cog-wheel on one of the wheels of the planter, which cog-wheels can be coupled at will by means of a sliding pinion capable of adjustment by means of mechanism, substantially as hereinafter fully set forth and claimed.

Reference is to be had to the accompanying drawings, forming part of this specification, in which similar letters of reference indicate corresponding parts in all the figures.

Figure 1:
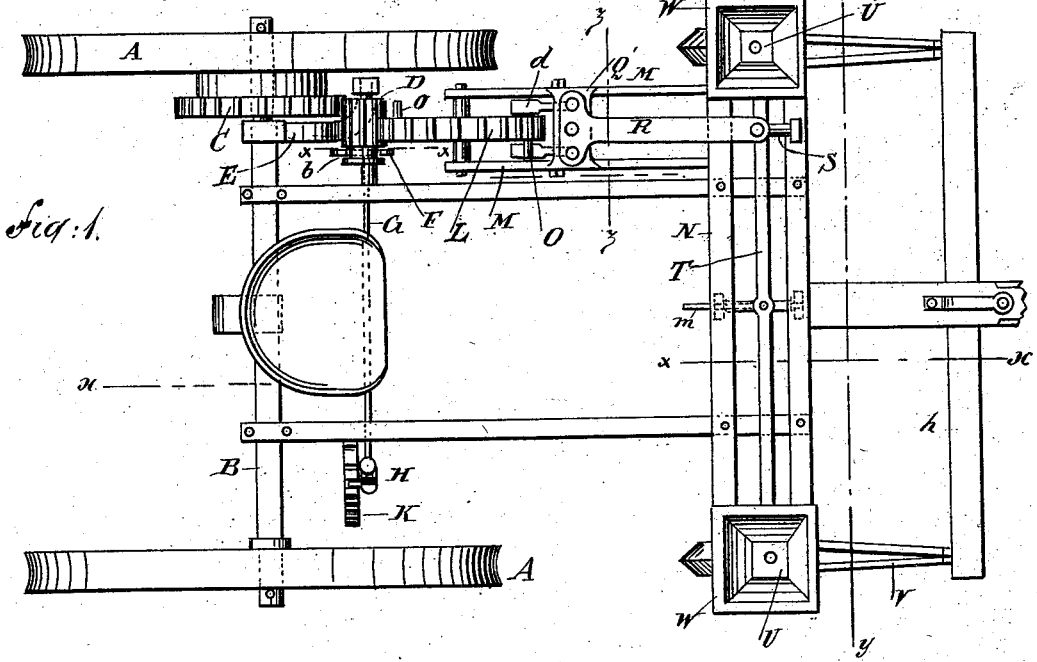
Figure 2:
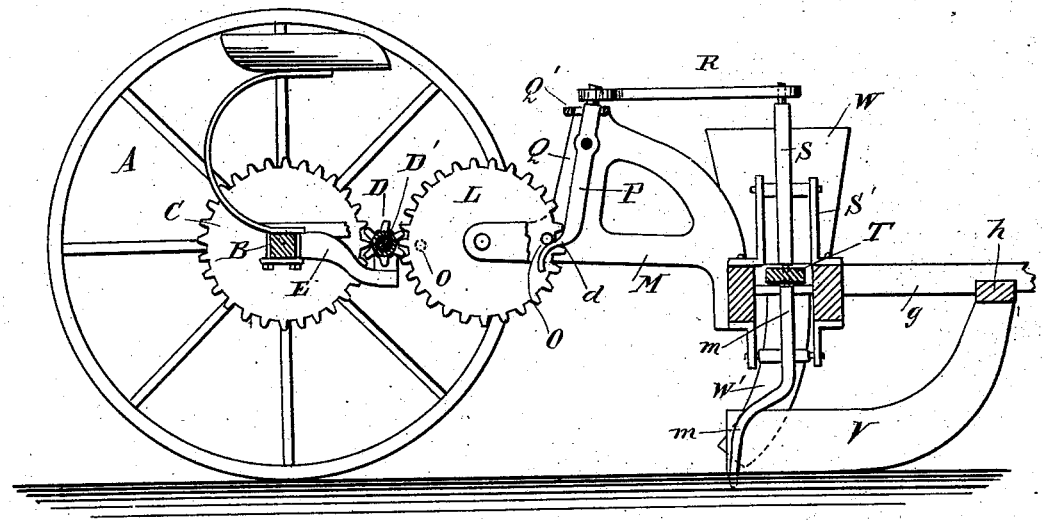
Figure 3:
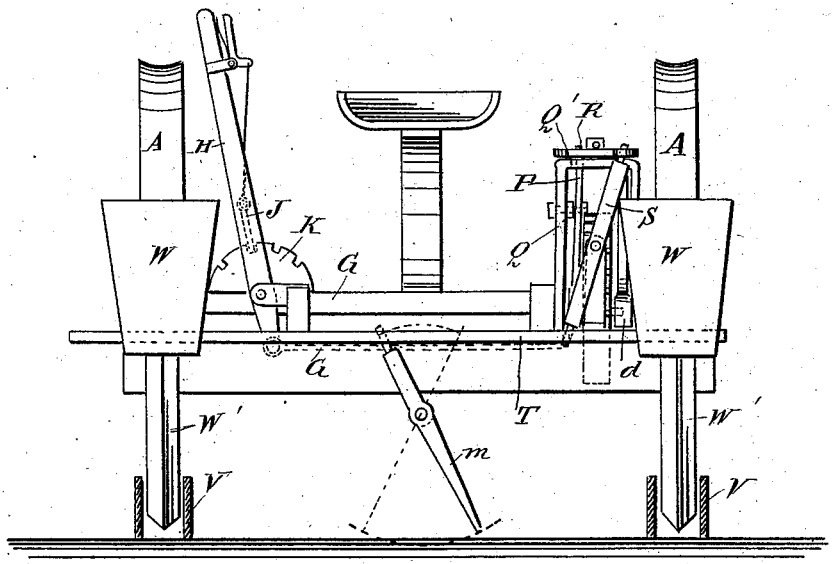
Figure 4:
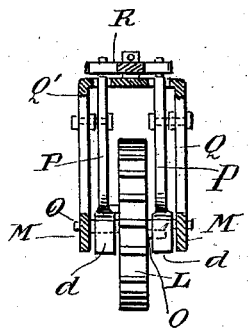

Figure 1 is a plan view of my improved corn-planter. Fig. 2 is a longitudinal sectional elevation of the same, on the broken line $x\ x$ of Fig. 1. Fig. 3 is a cross-sectional elevation of the same, on the line $y\ y$, Fig. 1. Fig. 4 is a cross-sectional elevation of the same, on the line $z\ z$, Fig. 1.

Two wheels, A A, supporting the planter are mounted on the axle B, the wheels having concaved rims. A cog-wheel, C, is rigidly mounted on the inner end of the hub of one of the wheels and engages with a horizontal barrel-pinion, D, mounted to slide on a horizontal shaft, D', held on an arm, E, projecting from the axle B, which barrel-pinion is provided at one end with a groove, $b$, for receiving a fork, F, secured on one end of the bar G, having its opposite end pivoted to the lower end of an upwardly-projecting lever, H, pivoted on the frame of the planter, which lever H is provided with a spring-locking lever, J, adapted to catch in the notches of a segmental or curved plate, K, for the purpose of locking the lever H and the barrel-pinion D in the desired position. The barrel-pinion D also engages with a cog-wheel, L, of the same diameter as the cog-wheel C, which cog-wheel L is journaled in the ends of two arms, M, projecting backward from the front transverse frame, N, of the planter. The wheel L is provided with two studs or pins, O, arranged diametrically opposite and projecting from opposite sides of the wheel, which pins are adapted to strike against the curved lower ends, $d$, of levers P, pivoted the sides of standards Q on the arms M, so that the said levers P can swing in the vertical plane, the levers being pivoted near their upper ends. The standards Q are united at their upper ends by a cross-piece, Q', on which a T-shaped lever, R, is pivoted at the intersection of the longitudinal shank with the cross-shank—that is, at the middle of the transverse shank—the said lever R swinging in the horizontal plane. The upper ends of the levers P pass through apertures in the ends of the transverse shank of the T-shaped lever R. The longitudinal shank of the lever R is considerably longer than the transverse shank, and in its end is held the upper end of a lever, S, pivoted to two standards, S', on the transverse frame N, so that the said lever S can swing in the vertical plane. The lower end of the lever S is connected with a sliding bar, T, to the ends of which valve-plates U are attached, which are adapted to close the bottom openings of the seed-boxes W, held on the ends of the front transverse frame, N.

The planter is provided in front of each wheel with a runner, V, which forms the furrow for receiving the seed, and from each of the said boxes a chute, W', extends down to the rear end of the corresponding runner, through which chute the seed is conducted. The upper ends of the runners are attached to a transverse bar, $h$, secured to the tongue $g$. A curved lever, $m$, is pivoted to a frame or brackets projecting downward from the front transverse frame, N, in such a manner that it can swing in the vertical plane transversely to the longitudinal axis of the planter, the upper end of the said lever being connected with the sliding bar T, so that every time the sliding bar is moved in the direction of its length—that is, transversely to the longitudinal axis of the planter—the lever $m$ will be swung in the same direction and its lower end will cut a groove in the ground, thus indicating the line in which the corn has been planted.

The operation is as follows: If the corn-feeding mechanism is to be operated so as to let the corn drop out of the boxes W through the chutes W', the lever H is swung in such a manner as to engage the barrel-pinion D with the cog-wheels C and L, whereby the cog-wheel L can be rotated from the wheel A, carrying the cog-wheel C. The pins O strike the lower ends $d$ of the levers P, and thus rock the T-shaped lever R in the horizontal plane on its pivot. The pins strike the levers P alternately, so that the lever S will be rocked alternately in opposite directions by the lever R. The rocking movement of the lower end of the lever S is transmitted to the sliding bar T, which alternately opens and closes the openings in the bottoms of the boxes W, and thus permits the corn to drop through the chutes W'. At the same time the marker $m$ is swung, and makes a mark in the ground, showing the rows in which the corn has been planted.

The planting mechanism can be disconnected from the wheel A, to which the cog-wheel C is attached, at any time by adjusting the barrel-pinion D in such a manner that it does not engage with the cog-wheel C. When the barrel-pinion is thus disengaged from the cog-wheel C, the mechanism can be adjusted to begin the operation at the proper time—that is, the cog-wheel L can be turned so that one of its pins strikes one of the levers P as soon as the cog-wheel L is coupled with the cog-wheel C; or the said cog-wheel L can be adjusted in such a manner that it begins to operate the levers after the wheel A has made part of a revolution.

The above-described corn-planter is very simple in construction, is strong, light, and durable.

In place of the cog-wheels for operating the machine, a sprocket and chain can be used.

Having thus described my invention, I claim as new and desire to secure by Letters Patent—

1. In a corn-planter, the combination, with the reciprocating bar T, with its ends entering the seed-boxes, of the marking-lever $m$, with its upper end connected directly to the bar T, and having its lower portion curved rearwardly, the centrally-pivoted lever S, the horizontally-vibrating T-shaped lever R, the rocking levers P, with their lower ends provided with rearwardly-curved arms $d\ d$, the cog-wheel L, having on opposite sides studs O, and shifting-pinion D, adapted to engage with the latter cog-wheel, and the cog-wheel C, substantially as and for the purpose set forth.

2. In a corn-planter, the combination, with the seed-boxes, of the reciprocating bar T, for opening and closing the apertures in the bottoms of the boxes, the lever S, connected with the bar T, the T-shaped lever R, adapted to swing in the horizontal plane and connected with the lever S, two pivoted levers, P, having their upper ends held in the ends of the cross-piece of the T-shaped lever R, the cog-wheel L, provided with studs O, diametrically opposite each other and on opposite sides of the said wheel, the cog-wheel C on one of the driving-wheels of the planter, and the pinion D, engaging with the cog-wheel C and L, and connected with mechanism for withdrawing it from between the said cog-wheels, substantially as herein shown and described, and for the purpose set forth.

THOMAS BELL.

Witnesses:
W. M. BRIGHT,
J. B. OWSLEY.